INVENTORS
PHILIP A. COLMAN
EUGENE C. FROST

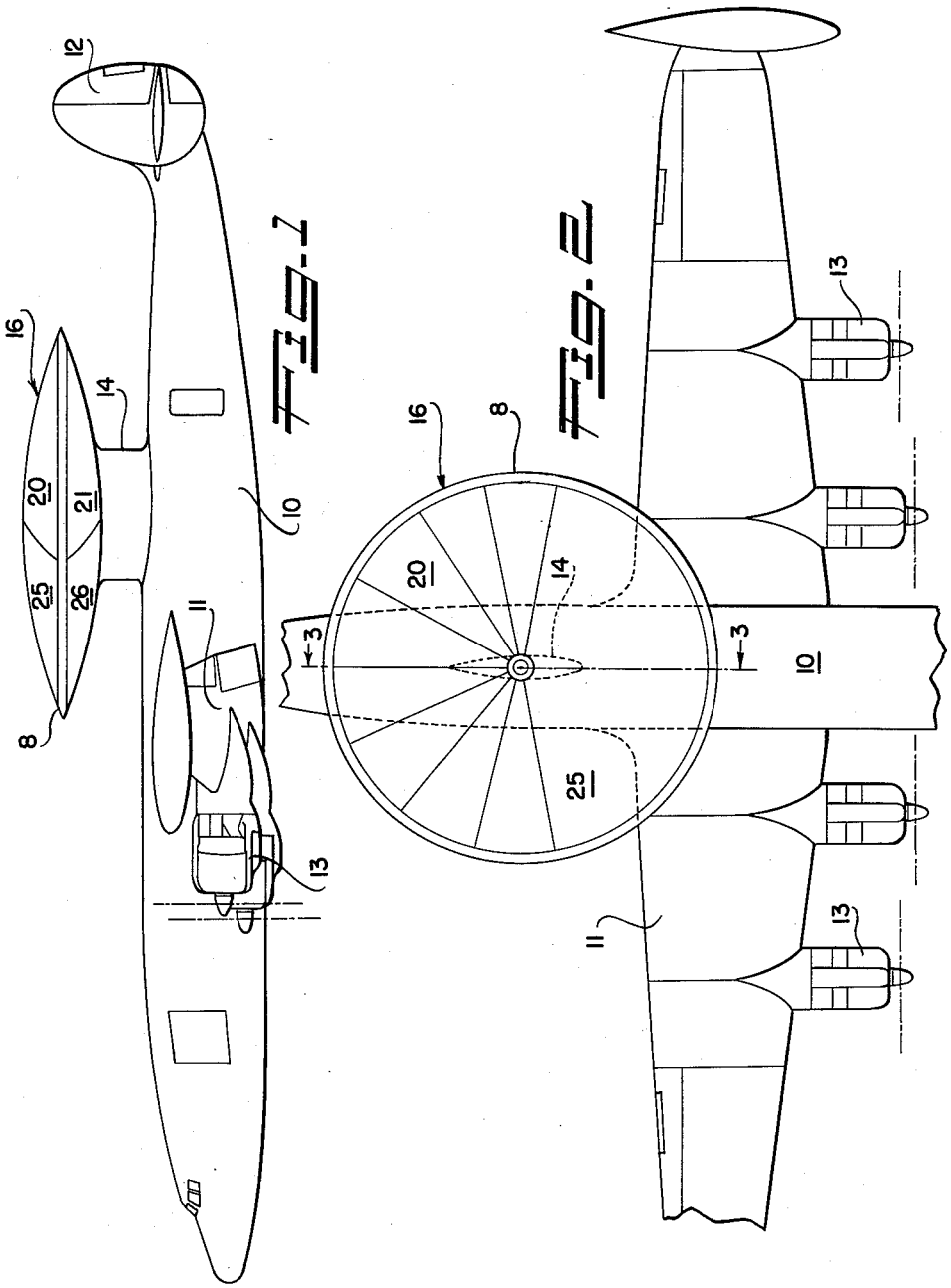

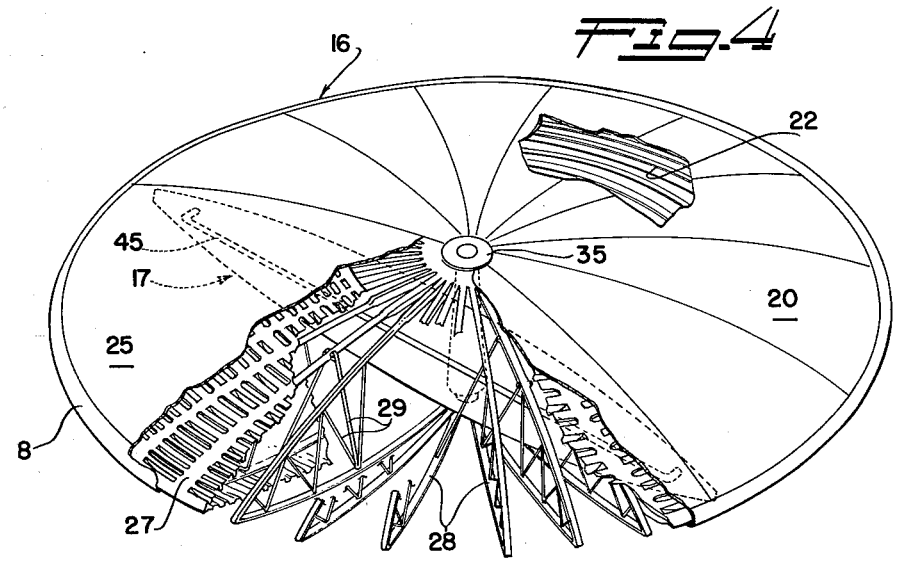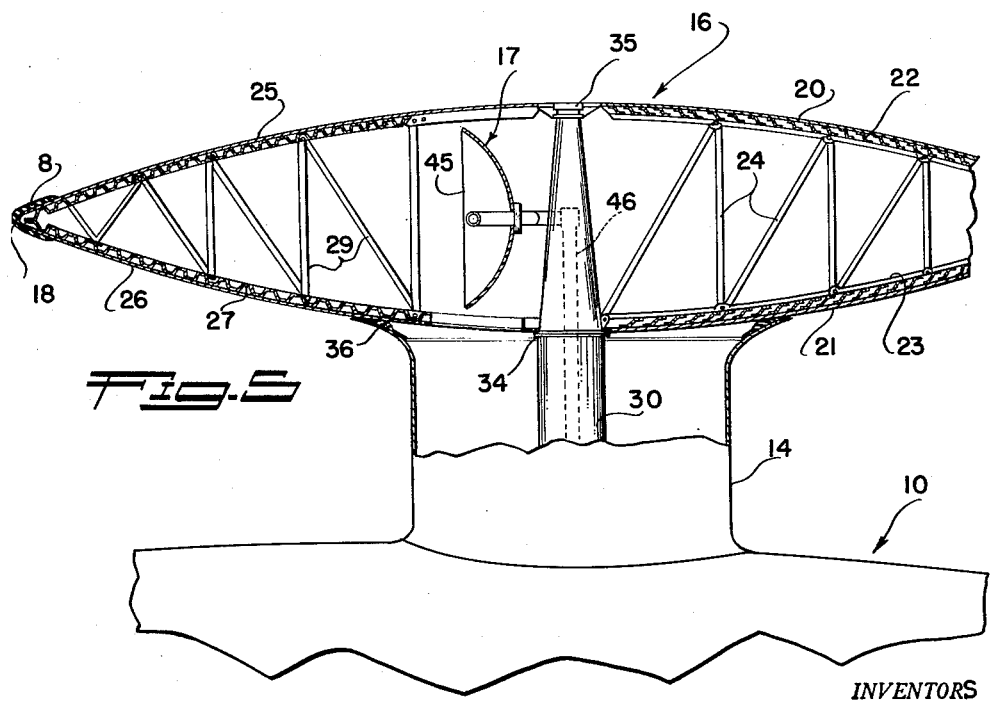

July 17, 1962  P. A. COLMAN ETAL  3,045,236
ROTATABLE RADOMES FOR AIRCRAFT
Filed Sept. 28, 1954  4 Sheets-Sheet 4

INVENTORS
PHILIP A. COLMAN
EUGENE C. FROST
By George A. Sullivan
Agent

United States Patent Office 3,045,236
Patented July 17, 1962

3,045,236
ROTATABLE RADOMES FOR AIRCRAFT
Philip A. Colman, Beverly Hills, and Eugene C. Frost, Burbank, Calif., assignors to Lockheed Aircraft Corporation, Burbank, Calif.
Filed Sept. 28, 1954, Ser. No. 458,874
9 Claims. (Cl. 343—705)

This invention relates to antennas and relates more particularly to the radar antenna of aircraft and to the radomes for the same.

It has been the general practice in the aircraft field to enclose the radar antenna of airplanes in radomes, the antennas themselves being driven or rotated and the enclosing radomes being stationarily secured to the airplanes. In such arrangements the radomes, or at least substantial portions thereof, must be constructed of materials that are substantially "transparent" to the high frequency energy and must be designed to permit free operation or movement of the antenna array within them. These and related considerations have made it difficult to construct radomes of adequate physical strength characteristics and have definitely tended to limit the size of the enclosed radiating elements, etc. that can be satisfactorily employed. For example, it has been found impractical in the past to mount on aircraft large radar antenna arrays suitable for operation at UHF because of the apparent impossibility of providing a suitable enclosing radome for the same.

It is a general object of our invention to provide a simple, effective antenna array-radome structure or combination that overcomes the difficulties and limitations inherent in the fixed radome-moving antenna arrangements now in use in aircraft.

Another object of the invention is to provide an antenna array system or structure in which the radome rotates together with the antenna enclosed thereby, the entire array or assembly constituting, in effect, a single rotating unit. This has, in addition to other desirable attributes, the distinct advantage of permitting the radome to be of optimum structural configuration as its major portions may be fabricated of metal, to have adequate strength and structural characteristics, with a "window" region of material transparent to the radiated energy. As this window region may be relatively small and as it is carried or supported by the stronger major section of the rotating radome, materially less dielectric material is required and the problems of aberration of the radar beams are therefore greatly reduced.

Another object of the invention is to provide an antenna array means of the character mentioned in which the radome presents a minimum frontal area and allows good streamlining for minimizing the drag penalty for a given antenna size. This feature or consideration makes it possible or practical to employ antenna of large size for certain or special uses that could not be successfully enclosed in or protected by the conventional fixed type radomes. This minimizes the performance loss to the airplane on which it is installed.

Another object of the invention is to provide an airplane-radome combination employing or incorporating a large or relatively large antenna-radome unit in which the location and shape of the radome do not detract to any appreciable extent from the stability, control or general handling characteristics of the airplane and wherein the radome offers a minimum of aerodynamic drag. The arrangement or combination of the invention is such that a large antenna may be effectively employed with a minimum of drag penalty and without interfering with the stability of the airplane or its control characteristics.

A further object of the invention is to provide an antenna-radome construction incorporating simple, effective means for mounting and rotating the combined rotatable antenna-radome unit.

Other objectives and features of the invention will become apparent from the following detailed description of typical preferred forms of the invention, throughout which description reference will be made to the accompanying drawings in which:

FIGURE 1 is a side elevation of an airplane equipped or provided with the antenna-radome means of the invention;

FIGURE 2 is a fragmentary plan view of the airplane shown in FIGURE 1;

FIGURE 4 is an enlarged perspective of the radome with portions broken away to illustrate internal structure;

FIGURE 5 is an enlarged fragmentary vertical sectional view of the rotating radome unit;

Figure 3:
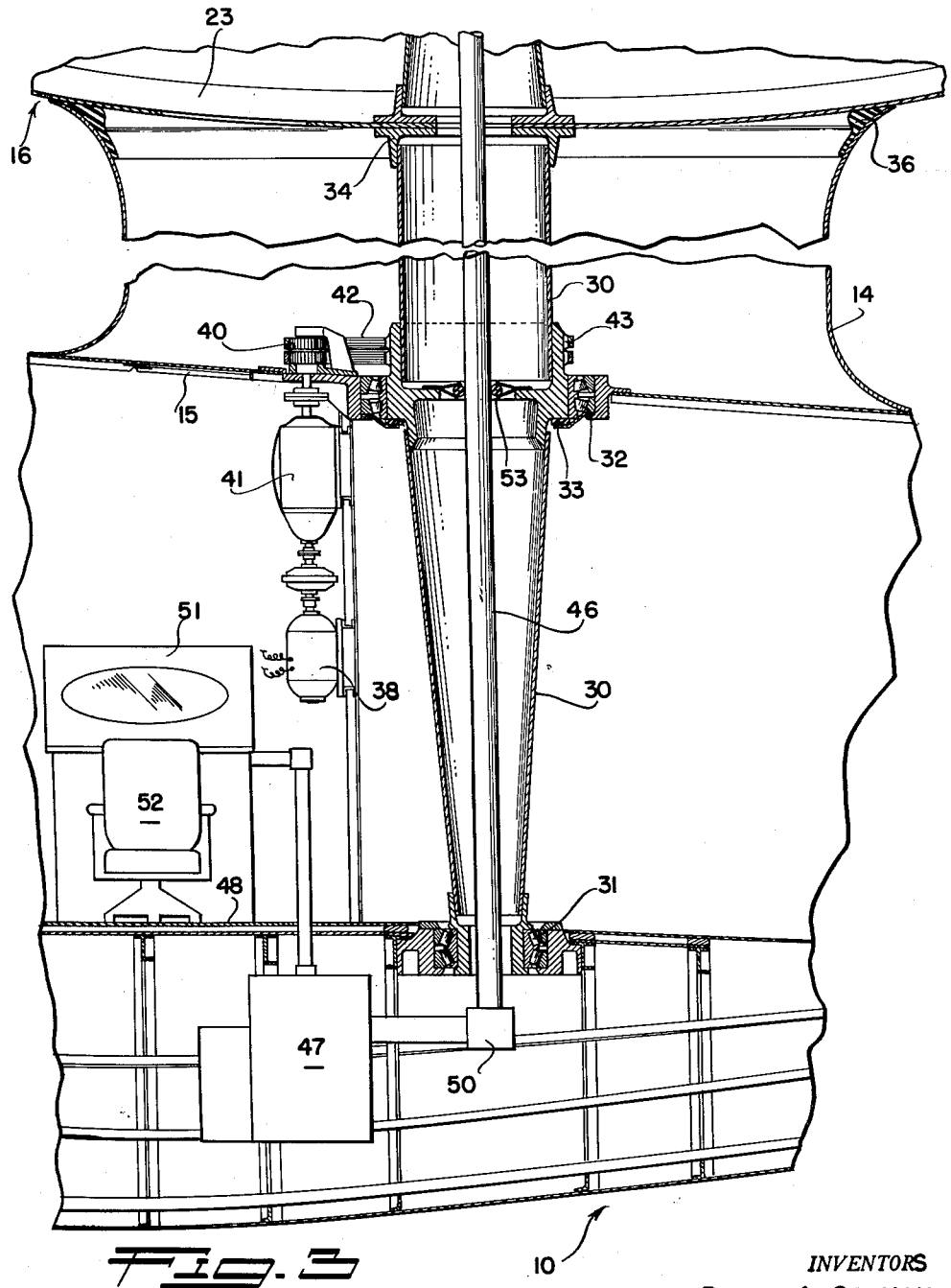
FIGURE 3 is an enlarged fragmentary vertical detailed sectional view taken substantially as indicated by line 3—3 on FIGURE 2, showing the radome mounting and rotating means and adjacent equipment.

The antenna-radomes of the invention may, of course, be applied to or used in connection with aircraft of different types designed for various classes of service and the antenna-radome means may be modified in size, shape, location, etc. to adapt them for given aircraft and/or for given intended fields of use. Accordingly, it is to be understood that the particular airplanes illustrated in the drawings and the particular configurations, locations, etc. of the antenna-radomes shown are not necessarily restrictive but are primarily typical and illustrative.

The airplane shown in FIGURES 1, 2, 3 and 5, includes a fuselage 10, wings 11, an empennage 12 and engine nacelles 13 carried by the wings 11. In accordance with the invention a pylon 14 extends from the fuselage 10. In this embodiment or application of the invention the pylon 14 extends upwardly from the fuselage 10 a short distance aft of the roots of the wings 11. The pedestal or pylon 14, as shown in FIGURE 2, is streamlined to offer a minimum of drag and is hollow or tubular and suitably faired into the fuselage 10 at its lower end. A hatch 15, in the fuselage, may give personnel access to the interior of the pylon 14 and the interior of the radome 16 to be described below.

The radome 16 serves to enclose and protect the radiator or antenna 17 and in accordance with the invention is movable or rotatable with the antenna. The shape and proportions of the radome 16 are dependent upon numerous factors such as the size and type of the airplane, the size and character of the antenna 17, the location of the radome on the aircraft, etc. It is desirable to shape and proportion and to locate the radome 16 to minimize drag and to alter the stability and control characteristics of the airplane to a minimum extent. In the preferred construction the radome 16 is circular or disc shaped in plan view, has convex upper and lower surfaces, and a sharp, thin or rounded peripheral edge. Thus, as illustrated, the upper and lower surfaces of the radome 16 each may be hemi-spherical or parabaloidal, these surfaces joining at a rather sharp circuit periphery 18, such a configuration being aerodynamically desirable. It is a feature of the invention that a substantial or major portion of the radome may be constructed of metal, for example, of aluminum alloy, titanium, or the like, and internally reinforced as found necessary. Thus there may be a metal portion of the radome comprising metal upper and lower skins 20 and 21, corrugated metal inner skins 22, radially extending metal ribs 23, and suitable internal trusses 24, diagonals, etc. As mentioned above, the radome also has a "window" portion constructed to be substantially transparent to the radar energy. This portion of the radome comprises upper and lower skins 25 and 26, constructed of fiberglass fabric impregnated with resin or plastic, corrugated inner skins 27 of like material and internal ribs 28, trusses 29, etc. of plastic or other dielectric materials. It should be observed that the metal portion of the radome 16 may be readily designed and constructed to have ample physical strength and the window or transparent portion of the radome may likewise be constructed and internally reinforced to be adequately strong as there are no parts or members moving or rotating within the radome to interfere with the installation of suitable structure. The skins 20 and 25 and 21 and 26 are joined, one with the other, at appropriate joints to provide a weather-tight enclosure. A suitable anti-icing or de-icing boot 8, or the equivalent, extends around the periphery 18 of the radome to prevent excessive ice formation or accumulation.

The radome 16 is supported at the upper end of the pylon 14 to rotate about a generally vertical axis. A tubular shaft 30 serves to carry the rotating radome. The shaft 30 extends downwardly into the fuselage 10 of the airplane and its lower end is carried in thrust bearings 31 mounted in the floor region of the aircraft. An intermediate portion of the shaft 30 is carried in anti-friction bearings 32, which may be at the upper skin region of the fuselage 10, and the shaft 30 continues upwardly through the pylon 14 and radome 16. A pressure seal 33 is provided at the bearings 32 to prevent the excessive leakage of cabin pressure air around the shaft 30. The upper and lower skin portions of the radome 16 and, if desired, internal structural members of the radome are secured to collars 34 and 35 on the shaft 30 to fix or attach the radome to the shaft so as to rotate therewith. As shown in FIGURE 3, it may be desirable to provide a weather seal 36 between the upper end of the pylon 14 and the lower side of the radome 16. The lower side of the radom 16 may have a hatch, or may be open adjacent the antenna 17, to give personnel access to the interior of the hollow radome.

During operation the radome 16 is rotated at a suitable rate, say at 6 r.p.m. The means for rotating the radome 16 includes a motor 38, mounted in the fuselage 10, to drive a sprocket set 40 through the medium of a reduction gearing 41. Chains 42 operate over the sprockets 40 and companion sprockets 43 on the shaft 30 to transmit rotation to the shaft and radome 16.

The antenna 17 is housed within the radome 16 to move or turn therewith and is positioned to "look through" or directly face the "window" portion of the radome. In accordance with the invention any selected or required antenna array may be employed. We have shown a simple, horizontally elongated parabolic radiator or antenna 17 equipped with an elongate tube or horn 45. The antenna 17 is arranged substantially horizontally in the radome 16 to extend tangentially, or almost diametrically, therein, being arranged adjacent but at one side of the shaft 30. It is to be observed that the antenna faces and looks through the dielectric window portion of the antenna and the strong metallic region of the radome is behind the antenna and may have skin parts, etc. extending above and below the antenna. A coaxial cable or wave guide 46 extends axially through the tubular shaft 30 to the antenna 17. The cable or guide 46 extends below the end of the shaft 30 and has a suitable rotary joint 50. The major portion of the cable or guide rotates with the shaft 30 and the cable or guide has a relatively stationary section extending from the joint 50 to the duplexor equipment 47 arranged in the fuselage 10, for example below the floor 48 of the fuselage. The duplexor equipment 47 is, in turn, operatively connected with the cathode ray tube apparatus 51 at the radar operator's station 52. A seal 53 on the interior of the tubular rotating shaft 30 engages around the cable 46 to prevent the excessive leakage of cabin air around the cable.

While, as already described, the proportions of the radome 16 may vary greatly in different installations, it is of interest to note that where a radome of the invention is installed on the type of airplane illustrated and in the general position illustrated, the radome may vary between thirty feet and fifty feet in diameter and from five feet to twelve feet in height or thickness, these dimensions being given only by way of explanation and not as restrictions or limitations. It will be readily apparent that a radome of such proportions readily accommodates a large effective antenna array means.

Figure 6:
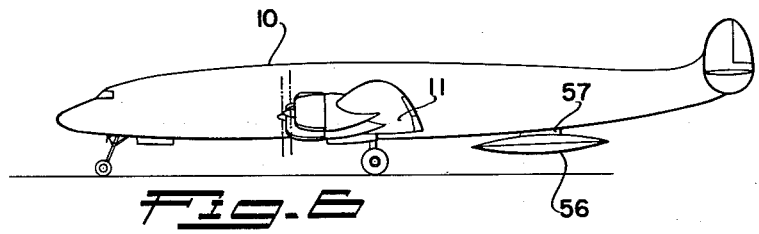
FIGURES 6 and 7 are side elevations of airplanes carrying or incorporating antenna-radome units of the invention mounted in different locations thereon.
Figure 7:
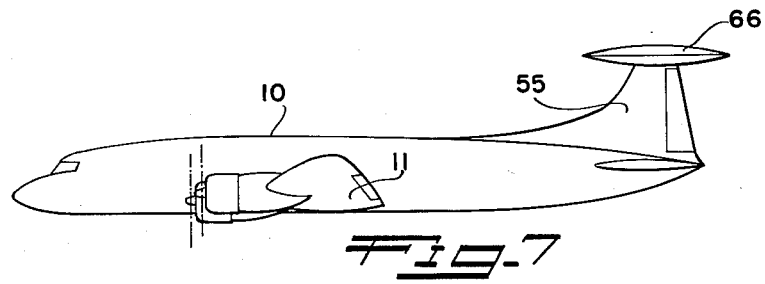

FIGURES 6 and 7 illustrate other typical positions or locations of the radome-antenna means of the invention. In FIGURE 6, a rotating radome-antenna 56 of the invention is shown positioned at the underside of the fuselage 10 of an airplane some distance aft of its wings 11. In such an arrangement it may be desirable to provide a suitable streamlined pylon 57 on the underside of the fuselage to extend downwardly to the upper face or skin of the radome. In FIGURE 7 we have shown a rotating radome-antenna 66 of the invention arranged at the tip or upper end of the fin or vertical stabilizer 55 of the airplane. It is to be understood that the radome-antenna units 56 and 66 of FIGURES 6 and 7 may be similar to the radome-antenna means illustrated in FIGURES 1 to 5 inclusive and may be rotated in the same fashion during operation.

Figures 8, 9, 10:
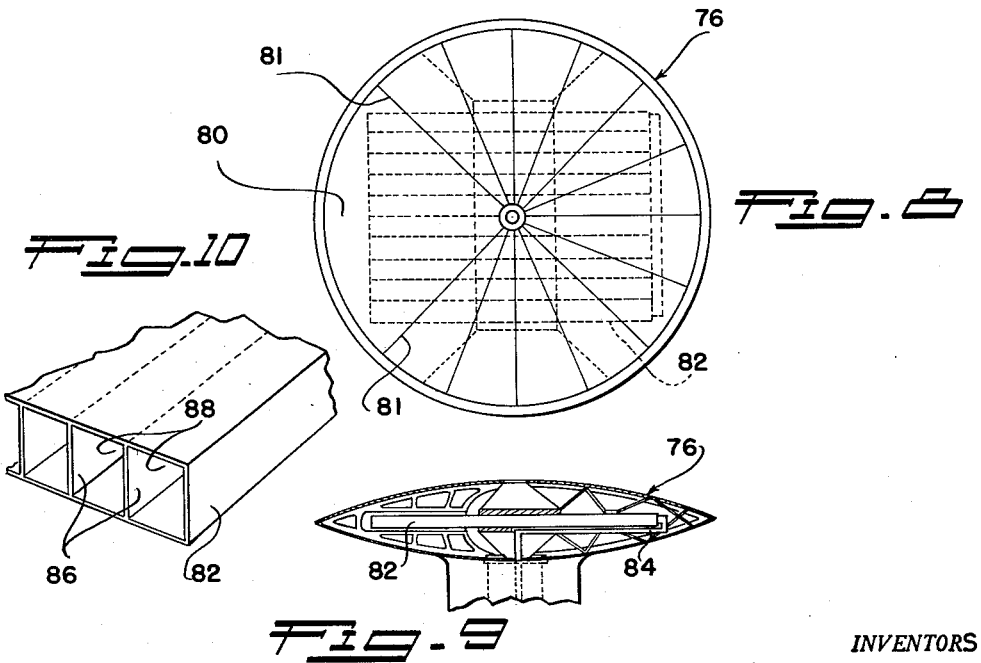
FIGURE 8 is a reduced plan view of a radome of the invention incorporating another type of radiator.
FIGURE 9 is a vertical sectional view of the radome shown in FIGURE 8 illustrating the wave guide arrangement for the radiator.
FIGURE 10 is an enlarged fragmentary perspective view of a portion of the antenna or radiator of FIGURES 8 and 9.

FIGURES 8, 9 and 10 illustrate another type of antenna arranged in a radome 76 of the invention to rotate therewith. The radome 76 may be substantially the same as the radome 16, being a disc-like hollow structure having a strong major metal portion and a window portion 80 of dielectric material. The window portion 80 joins the major metal portion at radiating lines 81. In this case the antenna 82 is a relatively flat, generally horizontal rectangular box-like structure having a plurality of internal parallel partitions 86 defining a multiplicity of radar energy paths or channels 88. The antenna 82 is secured in the radome 76 in such a manner that the open ends of these channels 88 face outwardly in the window portion 80 adjacent the periphery of the radome and a wave guide 84 is connected with the other ends of the channels 88 adjacent the diametrically opposite peripheral portion of the radome. The shaft 30 and the internal structure of the radome may straddle or bridge the box-like antenna 82, as shown generally in FIGURE 9. It will be observed that the disc-like radome 76 is adapted to house a large antenna of this rectangular box type.

It is believed that the operation and advantages of the radome-antenna means of the invention will be readily apparent from the foregoing detailed description. The antenna array being fixed within the radome 16 completely avoids the difficulties heretofore encountered with the conventional arrangements wherein the antenna rotated within the radome. The radome 16 of the invention has a major metal portion that is structurally efficient while the smaller window portion carried thereby and associated therewith may be readily constructed to have less radar energy aberration than the former radomes which, of necessity, had thicker walls and members of dielectric material. Furthermore, where the radome 16 may have an efficient aerodynamic configuration or shape, offering a minimum of drag during flight, it may be constructed sufficiently large to contain an antenna array entirely adequate for the intended uses. In this connection it should be observed that the radome 16 constructed as above described offers a minimum frontal area and aerodynamic drag for an antenna array of a given size. The areodynamically efficient radome 16 may be mounted or positioned on the airplane in a location and in a manner to maintain good airplane stability control and general handling characteristics.

Having described only typical forms of the invention we do not wish to be limited to the specific details herein set forth, but wish to reserve to ourselves any variations or modifications that may appear to those skilled in the art and fall within the scope of the following claims.

We claim:

1. In an aircraft having a body comprising a fuselage, wings and empennage the combination of, a disc shaped radome arranged at the exterior of the body to have its maximum diameter generally parallel to the direction of flight, the radome including an electromagnetic energy reflective metal major wall portion having a high strength to weight ratio and a second portion constructed of material substantially transparent to high frequency electromagnetic energy having a low strength to weight ratio as compared with that of the major wall portion, an antenna fixed within the radome and arranged to "look" through said second portion, means supporting the radome and antenna on the body for rotation as a unit about the central axis of the radome generally normal to the plane defined by the peripheral edge thereof, and means in the body for rotating the radome and antenna as a unit at a substantially constant rate to scan a full 360 degree sector of space.

2. In an aircraft having a body comprising a fuselage, wings and empennage the combination of, a radome arranged at the exterior of the body, the radome being of circular horizontal cross section and of bi-convex vertical cross section to have a circular peripheral edge and convex upper and lower surfaces, the radome including a portion substantially transparent to electro magnetic energy, an antenna array within the radome facing said transparent portion and being fixed relative thereto, means mounting the radome and antenna array on said body for rotation as a unit about an axis substantially normal to the direction of flight and substantially concentric with said circular edge, and means in said body for rotating the radome and antenna array at a substantially constant rate to scan a 360 degree sector of space.

3. In combination, an aircraft radome of circular horizontal cross section and of bi-convex vertical cross section to have a substantially circular periphery and convex upper and lower sides, the radome including a major portion constructed of high-strength material, and a second portion forming a window substantially transparent to radiant energy, an antenna array in the radome facing outwardly toward said second portion and being fixed relative thereto, and means carrying the radome and said array for rotation as a unit about an axis substantially coincident wtih the axis of curvature of said periphery.

4. In an airplane having a body comprising a fuselage, wings and an empennage the combination of; a streamlined pylon projecting from the body and fixedly secured thereto, a disc shaped radome at the outer end of the pylon having its maximum diameter in a plane generally parallel with the fore and aft axis of the fuselage, means supporting the radome for rotation about an axis substantially concentric with the radome and generally normal to the peripheral edge thereof, and a radar antenna within the radome and rotatable therewith.

5. In an airplane having a fuselage, a streamlined pylon projecting from the upper side of the fuselage and fixedly secured thereto, a disc shaped radome at the upper end of the pylon spaced above the fuselage, the radome having its maximum diameter in a plane generally parallel with the fore and aft axis of the fuselage, means supporting the radome for rotation about an axis substantially concentric with the radome and generally normal to the peripheral edge thereof, means for rotating the radome, and an antenna in the radome rotatable therewith.

6. In an airplane having a fuselage, a streamlined pylon projecting from the upper side of the fuselage and being fixedly secured thereto, a disc shaped radome at the upper end of the pylon spaced above the fuselage, the radome having hemispherical upper and lower sides equally and oppositely convexly curved joining at a relatively sharp peripheral edge, the maximum diameter of the radome being in a plane generally parallel with the fore and aft axis of the fuselage, means supporting the radome for rotation about an axis substantially concentric with the radome and generally normal to the peripheral edge thereof, means for rotating the radome, and antenna means in the radome rotatable therewith.

7. In an airplane having a fuselage, a streamlined pylon projecting from the upper side of the fuselage and being fixedly secured thereto, a disc shaped radome at the upper end of the pylon spaced above the fuselage, the radome having hemispherical upper and lower sides equally and oppositely convexly curved joining at a relatively sharp circular peripheral edge, the maximum diameter of the radome being in a plane generally parallel with the force and aft axis of the fuselage, means extending through the pylon supporting the radome for rotation about an axis substantially concentric with the radome and generally normal to the peripheral edge thereof, and means acting on the last named means to rotate the radome.

8. In an airplane having a fuselage, a streamlined pylon projecting from the upper side of the fuselage and being fixedly secured thereto, a disc shaped radome at the upper end of the pylon spaced above the fuselage, the radome having its maximum diameter in a plane generally parallel with the fore and aft axis of the fuselage, means supporting the radome for rotation about an axis substantially concentric with the radome and generally normal to the peripheral edge thereof, means for rotating the radome at a substantially constant rate, means for sealing between the upper end of the relatively stationary pylon and the underside of the rotating radome, and an antenna in the radome rotatable therewith.

9. In an airplane having a fuselage, a streamlined pylon projecting from the upper side of the fuselage and being fixedly secured thereto, a disc shaped radome at the upper end of the pylon spaced above the fuselage, the radome having its maximum diameter in a plane generally parallel with the fore and aft axis of the fuselage, a shaft extending from the fuselage and passing upwardly through the pylon to carry the radome for rotation about an axis substantially concentric with the radome and generally normal to the peripheral edge thereof, antenna means fixedly secured within the radome and means for rotating the radome and antenna at a substantially constant rate to scan a full 360 degree sector of space.

References Cited in the file of this patent
UNITED STATES PATENTS 1,391,681    Hahnemann    Sept. 27, 1921

(Other references on following page)

UNITED STATES PATENTS

| | | | |
|---|---|---|---|
| 2,217,989 | Morgan | Oct. 15, | 1940 |
| 2,607,009 | Affel | Aug. 12, | 1952 |
| 2,617,934 | McMillan et al. | Nov. 11, | 1952 |
| 2,700,104 | Bowman | Jan. 18, | 1955 |
| 2,702,346 | Evans | Feb. 15, | 1955 |
| 2,814,083 | Miller | Nov. 19, | 1957 |

FOREIGN PATENTS

| | | | |
|---|---|---|---|
| 519,809 | Great Britain | Apr. 5, | 1940 |
| 738,033 | Germany | July 1, | 1943 |

OTHER REFERENCES

Radar Scanners and Radomes by Cady, Karelitz and Turner, McGraw-Hill, New York (1948). (Pages 430 to 437 relied on.)

Schlieben: "Radomes and Aircraft Design," Aeronautical Engineering Review, May 1952, pp. 69–81.